United States Patent Office 2,721,176
Patented Oct. 18, 1955

2,721,176

RESINOUS PRODUCTS

Troy L. Cantrell, Drexel Hill, Pa., John G. Peters, Audubon, N. J., and Herschel G. Smith, Wallingford, Pa., assignors to Gulf Oil Corporation, Pittsburgh, Pa., a corporation of Pennsylvania No Drawing. Application December 3, 1952,
Serial No. 323,944

37 Claims. (Cl. 252—37.2)

This invention relates to new resinous products and, more particularly, it is concerned with oil soluble resins which are advantageously used in various mineral oil compositions as stabilizers, detergents, etc.

This application is a continuation-in-part of our copending application Serial No. 789,776, filed December 4, 1947, now abandoned and assigned to the same assignee as the present application.

It is an object of this invention to provide a new and useful class of mineral oil soluble, permanently thermoplastic, resinous reaction products. A further object of this invention is to provide products of the character described which are particularly suitable for the compounding of lubricating oils and other mineral oil compositions.

These and other objects are achieved by the present invention wherein mineral oil soluble, metal and sulfur containing, permanently thermoplastic, resinous materials are obtained by condensing in an aqueous medium an alkylated monohydric phenol having at least one free reactive position in the nucleus, at least one alkyl group of such alkylated phenol containing at least 4 carbon atoms, a primary or secondary amine, formaldehyde and a metal sulfide selected from the group consisting of alkali metal sulfides, alkaline earth metal sulfides and mixtures thereof; the mol ratio of amine to phenol ranging from 0.1 to 1, at least one mol of formaldehyde being employed for every two mols of the total molar amount of phenol and amine, and at least one equivalent of the metal sulfide being employed for every two mols of the phenol.

The invention also includes the production of metal resinous compounds, other than the alkali metal compounds, by metathesis of any of the alkali metal resinous compounds obtained as described above with a water soluble salt of a metal other than an alkali metal.

The resinous products obtained in accordance with this invention are excellent additives for various mineral oil compositions and the invention also contemplates such compositions.

In preparing the resins of our invention, it is necessary not to permit substantial reaction between the mixture of phenol and amine on the one hand and formaldehyde on the other in the absence of the metal sulfide. Accordingly, it is preferred to mix all of the reactants and react them simultaneously. However, the metal sulfide and the formaldehyde can first be mixed and partially reacted, followed by addition of the phenol and the amine to the reaction mass and further reaction; or the alkali metal sulfide and phenol, with or without the amine, can first be reacted followed by reaction with the formaldehyde and the amine, if the latter was not employed earlier.

The condensation reaction of our invention takes place spontaneously at room temperatures, but it is preferred to employ moderately elevated temperatures in order to obtain reasonably rapid reaction rates. When there is employed the reaction sequence of first reacting the phenol and alkali metal sulfide and then reacting with formaldehyde, the phenol and alkali metal sulfide, with or without the amine, can be reacted first at temperatures as high as 400° F. Thereafter, for the subsequent reaction with formaldehyde, the reaction mass is cooled to about 120° F. to 180° F. to avoid excessive volatilization of formaldehyde. In any instance where formaldehyde is present in the reacting mass, whether initially or otherwise, it is desirable not to exceed a reaction temperature of about 200°–210° F. in order to avoid loss of formaldehyde, although this loss can be avoided when employing temperatures higher than about 210° F. by the use of closed reaction vessels.

Since the formaldehyde is most conveniently used in the form of commercial aqueous formalin containing 37 per cent by weight of formaldehyde, sufficient water for the reaction is generally contained in the formalin solution. However, the metal sulfides may be conveniently dispersed and/or dissolved in water to form an aqueous slurry or solution even when formalin is used.

In order to obtain the oil-soluble metal and sulfur containing resins of our invention, at least one mol of formaldehyde must be used for every two mols of the total molar amount of phenol and amine. Amounts of formaldehyde less than this tend to yield oil-insoluble resins. Amounts of formaldehyde in excess of the amount stated can be employed, since any formaldehyde in excess of the amount reacted is either volatilized off in the reaction or in the subsequent dehydration of the resin.

As has been stated heretofore, the amount of alkali metal sulfide or alkaline earth metal sulfide, or mixtures of these sulfides, is in the proportion of at least one equivalent of metal sulfide for every two mols of the phenol.

The use of a primary or secondary amine in the condensation reaction produces a resinous product containing a basic nitrogen atom which is capable of exerting a neutralization effect on acidic materials. In order to obtain resinous compounds which contain a significant amount of a basic nitrogen atom in accordance with our invention, the mol ratio of the amine reactant to the phenol reactant should be at least about 0.1. Larger amounts of the amine can be used up to about an equimolar ratio of amine to phenol while still obtaining the beneficial effects of oil solubility and antioxidant action conferred by the phenolic reactant on the resinous reaction product.

After the condensation reaction described above is completed, the temperature is raised to distill off all water, both that formed in the condensation and added with the reactants, to dehydrate the product. This or any other dehydration step conventional in the formation of resinous phenol-formaldehyde condensation products can be employed. Although the condensation reaction can be carried out solely in an aqueous medium, when the resinous product is to be used as a mineral oil additive, it is advantageous to use in addition a light naphtha solvent or a mineral lubricating oil which may be of the same general type as the oil to which the resin is to be added. There is then obtained, after dehydration, a concentrate of the resin in solution in the naphtha or mineral lubricating oil, as the case may be. These concentrates are conveniently employed for preparing blends of the resins with various mineral oils.

The phenolic compounds employed in preparing our new resins are alkylated monohydric phenols having at least one alkyl group of at least 4 carbon atoms. As will be understood by those skilled in the art, such phenols must have at least one reactive position in the nucleus which is free of substituents. The presence of at least one alkyl group of at least 4 carbon atoms in the phenol insures oil solubility of the resinous condensation products prepared therefrom. Phenols not containing such group tend to yield products which are insoluble in mineral lubricating oils.

The alkylated phenols can readily be prepared by alkylating phenol or the simple monohydric homologues thereof, such as the naphthols, cresols, and ethyl and propyl phenols with an alkyl halide or an alkanol in the presence of a Friedel-Crafts catalyst. Alternatively, alkylation can be performed with an olefin in the presence of concentrated sulfuric acid as a catalyst. The alkyl halides, alkanols and olefins employed in these alkylation reactions contain at least 4 carbon atoms and are selected to yield such alkyl radicals as butyl, amyl, heptyl, octyl, nonyl, decyl, stearyl and cetyl. The long chain groups derived from paraffin wax are also suitable; these yield the so-called "wax" phenols. Alkyl substituents containing from 4 to 12 carbon atoms form a preferred class. The alkylation reactions described are conventional and need not be further elaborated here.

Representative alkyl phenols of the class described include n-butyl phenol, sec-butyl phenol; tert-butyl phenol; 2-tert-butyl,4-methyl phenol; 2,4-di-tert-butyl phenol; 2,6-di-tert-butyl phenol; 2-tert-butyl,4-ethyl phenol; n-amyl phenol; di-tert-amyl phenol; hexyl phenols; heptyl phenols; n-octyl phenol; iso-octyl phenol (alpha, alpha, gamma, gamma tetramethylbutyl phenol); nonyl phenol; decyl phenol; tri-isobutyl phenol; "wax" phenols; etc. Particularly good results have been obtained with tetramethylbutyl phenol.

The primary or secondary amines employed in the preparation of our resinous products include primary and secondary aliphatic and aromatic amines, as well as mixed amines of these classes, e. g., aralkyl and alkaryl amines, both primary and secondary, and N-alkyl, N-aryl secondary amines. Primary alkyl amines such as methyl, ethyl, butyl, amyl, hexyl, cyclohexyl, heptyl, octyl, decyl, undecyl, dodecyl, tetradecyl, hexadecyl, octadecyl and eicosyl amines are suitable. Mixtures of primary fatty amines such as are present in commercially available amines derived from fatty acids by well known methods are also suitable. For example, a commercial amine known as "Armeen CD" or cocoamine obtained from coconut oil fatty acids by well known methods, having an average molecular weight of about 200, and containing 8 per cent octyl amine, 9 per cent decyl amine, 47 per cent dodecyl amine, 18 per cent tetradecyl amine, 5 per cent octadecyl amine and 5 per cent octadecenyl amine, is a preferred amine reactant. Primary alkenyl amines corresponding to the primary alkyl amines, such as undecenyl, oleyl, octadecadienyl, etc., can also be employed. Suitable primary aromatic amines include aniline, naphthylamine, etc. Alkaryl amines such as toluidine and xylidine, and aralkyl amines such as benzylamine can also be employed. Suitable secondary amines include diethanol amine, diamyl amine, dicyclohexyl amine, N-ethyl aniline, N-methyl aniline, diphenyl amine and the like.

The alkali metal sulfides contemplated by this invention include the monosulfides of sodium, potassium, lithium, rubidium, and caesium. The alkaline earth metal sulfides contemplated by this invention include the monosulfides of calcium, barium, strontium and magnesium. As used herein and in the appended claims, the term "sulfide" is understood to be limited to the "monosulfide." Because of their relative cheapness and availability, sodium sulfide is preferred as the alkali metal sulfide, and calcium and barium sulfides form preferred alkaline earth metal sulfides.

As has been stated heretofore, metal resinous compounds other than the alkali metal compounds can be prepared by metathesis of an alkali metal resin compound of this invention with a water soluble salt of such other metal. Thus an alkali metal containing resin is first prepared in the manner disclosed, i. e., by the condensation of formaldehyde, an alkylated phenol, a primary or secondary amine and an alkali metal sulfide, with or without an alkaline earth metal sulfide, and then such alkali metal containing resin is reacted with the desired water soluble metal salt to achieve a double decomposition reaction. Preferably, the metathesis reaction is conducted prior to dehydration of the alkali metal resin, and dehydration is accomplished after metathesis. In this manner, metal containing resins can be readily prepared containing such metals as the alkaline earth metals, tin, copper, lead, zinc, manganese, cadmium, beryllium, silver, mercury, aluminum, bismuth, antimony, vanadium, chromium, iron, cobalt and nickel. Any of the nitrate, sulfate, chloride or alcoholate salts of the above metals which are appropriately water soluble can be used. If desired, part of the alkali metal can be retained in the product by employing less than stoichiometrical amounts of the water soluble metal salt in the metathesis reaction.

It will be obvious from the foregoing that resins containing more than one metal can be prepared, and the invention also contemplates such resins. In this connection, it is to be noted that resins containing more than one metal can also be prepared without metathesis by employing a mixture of an alkali metal sulfide and an alkaline earth metal sulfide in the condensation reaction. The resulting resinous product can then also be subjected to metathesis to yield still a further class of resinous compounds containing more than one metal.

The following examples are illustrative of the preparation of our new resins and are not intended to limit the invention.

EXAMPLE I

Paratetramethylbutyl phenol was prepared as follows: Into a jacketed iron reaction vessel were charged 12.9 parts by weight of phenol and 16.5 parts by weight of di-isobutylene. The vessel was closed and the mixture agitated. Then 0.6 parts by weight of 94 to 98 per cent sulfuric acid were added. The temperature was permitted to attain 220° F. and was held at that point for four hours.

To the resulting paratetramethylbutyl phenol there was added 70 parts by weight of a mineral lubricating oil. Then 13.4 parts by weight of a 50 per cent by weight aqueous solution of sodium sulfide were added, and the mixture agitated for one hour at 180° F. Then 2.5 parts by weight of aniline and 11.6 parts by weight of a 37 per cent by weight aqueous solution of formaldehyde were gradually added stepwise, and the mixture was agitated and maintained at a temperature not in excess of 200° F. After two hours at this temperature, 15.3 parts by weight of a 50 per cent by weight aqueous solution of calcium chloride was added and the temperature raised to 210–220° F. for four hours. The temperature was then raised to 280° F. to distill off all of the water added and that formed in the reaction. Thereafter, three parts by weight of a diatomaceous earth filter aid (Celite) were added and the product was filtered through a continuous filter. The product had the following properties:

| | |
|---|---|
| Gravity: °API | 20.3 |
| Viscosity, SUV: | |
| 210° F | 93.2 |
| Color, NPA | 4.5 |
| Sulfur, B, percent | 1.6 |
| Neutralization No | 10.2 alk. |
| Ash as sulfate, percent | 5.3 |

The reactants in the above example were in the following relative molar proportions: sodium sulfide, 1 mol; paratetramethylbutyl phenol, 2 mols; aniline, 0.5 mol; formaldehyde, 2 mols; and calcium chloride, 1 mol.

EXAMPLE II

Three (3) mols of tetramethylbutyl phenol (660 parts by weight) and 815 parts by weight of a light mineral lubricating oil having a viscosity of 70 SUS at 100° F.

were placed into an enamel lined reaction vessel and heated to 160° F. to melt the phenol. Thereafter, 1.5 mols of sodium sulfide in aqueous solution (117 parts by weight Na₂S dry basis) were added and the mixture heated to 200° F. for one hour with stirring. Thereafter, the mixture was cooled to 160° F. and 0.5 mol of cyclohexylamine (50 parts by weight) and 3 mols of formaldehyde (255 parts by weight of formalin) were slowly added. The mixture was then agitated at 180° F. for one hour. Thereafter, the temperature was raised to 280° F. to distill off all water, an additional 815 parts by weight of the light mineral oil was added and the whole was filtered through diatomaceous earth. The solution of the resin thus obtained had the following properties:

| | |
|---|---|
| Gravity: °API | 20.7 |
| Viscosity, SUS | |
| 100° F | 1056 |
| 210° F | 89.9 |
| Color, ASTM union | 3.25 dil. |
| Sulfur, B, percent | 1.16 |
| Ash as sulfate, percent | 5.46 |

EXAMPLE III

Example II was repeated, using in place of the sodium sulfide 1.5 mols of calcium sulfide in the form of a water slurry (108 parts by weight of calcium sulfide, dry basis) and 0.5 mol of N-methyl aniline (54 parts by weight) instead of the cyclohexylamine. The total amount of mineral oil used was 1650 parts by weight. The mineral oil solution of the resin thus prepared had the following properties:

| | |
|---|---|
| Gravity: °API | 22.0 |
| Viscosity, SUS: | |
| 100° F | 451 |
| 210° F | 59.2 |
| Color, ASTM union | dark |
| Sulfur, B, percent | 0.32 |
| Ash as sulfate, percent | 3.95 |

EXAMPLE IV

Example II was repeated, except that 1.5 mols of calcium sulfide were employed in place of the sodium sulfide and 0.5 mol of "Armeen CD" was used in place of the cyclohexylamine. The total amount of mineral oil used was 1700 parts by weight. The mineral oil solution of the resin obtained had the following properties:

| | |
|---|---|
| Gravity: °API | 23.2 |
| Viscosity, SUS: | |
| 100° F | 366 |
| 210 | 59.2 |
| Color, ASTM union | dark |
| Sulfur, B, % | 0.32 |
| Ash as sulfate, % | 3.64 |

EXAMPLE V

Example II was repeated, using 0.5 mol of diphenylamine (85 parts by weight) in place of the cyclohexylamine. The total amount of mineral oil used was 1640 parts by weight. The mineral oil solution of the resinous product had the following properties:

| | |
|---|---|
| Gravity: °API | 19.8 |
| Viscosity, SUS: | |
| 100° F | 955 |
| 210° F | 73 |
| Color, ASTM union | 3.75 |
| Sulfur, B, percent | 1.15 |
| Ash as sulfate, percent | 5.75 |

EXAMPLE VI

Two (2) mols of tetramethylbutyl phenol (440 parts by weight), 0.5 mol of sodium sulfide in aqueous solution (39 parts by weight Na₂S dry basis), 0.5 mol of barium sulfide (85 parts by weight), 0.5 mol of "Armeen CD" (100 parts by weight), 2 mols of formaldehyde (162 parts by weight of formalin) and 75 parts by weight of Stoddard solvent were added to a suitable reaction vessel equipped with a stirrer and reflux condenser. The mixture was heated with stirring to 210° F. and refluxed at this temperature for 3 hours. Thereafter, the temperature was raised to 250° F. to distill off all water. The residual solution was then filtered through diatomaceous earth. The Stoddard solvent was then removed by distillation under vacuum leaving a resinous residue having the following properties:

| | |
|---|---|
| Gravity, solid state: | |
| Sp. Gr., 60°/60° F | 1.197 |
| Melting point, °F | 163–267 |
| Color | dark brown |
| Sulfur, B, percent | 4.8 |
| Ash as sulfate, percent | 19.39 |

While the above examples have illustrated the use of tetramethylbutyl phenol, the preferred phenol, other monohydric alkylated phenols, as disclosed herein, can be used with good results. Similarly, other alkali metal sulfides, other alkaline earth metal sulfides and other water soluble salts for the metathesis reaction can be employed in place of those shown in the examples.

Our new resinous products are excellent addition agents for various mineral oils. They are readily soluble in all types of mineral lubricating oils, that is, paraffinic, naphthenic or mixed base oils, and can be blended with them in high proportions. This excellent solubility of our new products enables the preparation of concentrated solutions thereof, as shown in the foregoing examples, which may then be diluted with additional oil to the proportions desired in the final mineral oil compositions.

These new agents confer excellent detergent effects and rust inhibiting properties on the mineral lubricating oils in which they are incorporated, and generally confer bearing corrosion inhibiting properties on the oils containing them. For these purposes our new addition agents are added to mineral lubricating oils in minor amounts, say from about 0.1 to about 25 per cent by weight of the oil, sufficient to confer improved detergent properties on the oils in which they are incorporated. Generally, the addition of about 1 to 2 per cent by weight of our new resins is sufficient to effect the desired improvement, but larger amounts are employed for heavy duty applications.

Our new resins can also be added to mineral oil lubricant greases, that is, mineral lubricating oils thickened to the consistency of a grease by a suitable soap. Our new resins thereby improve the stability of the grease by increasing its resistance to oxidation. In general, small amounts of our resins, say from 0.1 to 5 per cent by weight on the grease, will suffice. As is known in the art, the mineral oils used as bases in manufacturing greases include paraffinic, naphthenic and mixed base mineral lubricating oils. The soaps used in thickening the mineral oil base to a grease are fatty acid soaps derived from fatty materials such as tallow, lard, cottonseed oil, hydrogenated castor oil, stearic acid, hydrogenated fish oil fatty acids and various other fats and fatty acids. The metal of the soaps can be an alkali metal, an alkaline earth metal, and various other metals such as lead, zinc, chromium, tin, aluminum, nickel, cadmium, etc. As will be understood by those skilled in the art, the soap and mineral oil base will be selected in accordance with the specific properties of the grease it is desired to manufacture.

Our new resins are not only useful in mineral oil lubricants but can be added to various mineral oils and compositions thereof to improve them in one or more respects. Thus, our new resins can be added to gasolines to retard haze formation and to distillate fuel oils to retard sludge formation. Because of their rust inhibiting properties, our new resins can be added to various volatile and non-volatile petroleum solvents and compositions to obtain improved coating compositions and slushing oils. For the stabilization of fuels such as gasoline, Diesel fuels and distillate furnace oils, small amounts as low as 0.001 per cent by weight of our resins can be employed, but somewhat larger amounts, from 0.01 to 5 per cent by weight, are preferable. Even larger amounts can be used, if desired, without harmful effect. The amount of resin to be used for the preparation of coating compositions containing mineral oils will vary with the nature of the coating required, but in general from about 0.1 to about 25 per cent of the resin will give satisfactory results.

From the foregoing it will be observed that the new resins of our invention are added to mineral oils in amounts ranging from 0.001 to 25 per cent by weight, depending on the nature of the mineral oil and the improvement desired, as will be apparent to those skilled in the art.

The following examples illustrate the use of our new resinous products to obtain improved mineral oil compositions.

The beneficial effects of our new resins in mineral lubricating oils are shown in the following table where the resinous products of Examples I to V, inclusive, were incorporated into a highly refined motor lubricating oil of SAE 30 grade in a proportion of 4 per cent by volume of the concentrate solution prepared in accordance with the respective examples.

*Table I*

| | Base Oil | Oil with Ex. I Additive | Oil with Ex. II Additive | Oil with Ex. III Additive | Oil with Ex. IV Additive | Oil with Ex. V Additive |
|---|---|---|---|---|---|---|
| Gravity: °API | 29.2 | 28.6 | 28.5 | 28.9 | 29.0 | 28.6. |
| Viscosity, SUS: | | | | | | |
| 100° F | 527 | 547 | 540 | 537 | 533 | 537. |
| 210° F | 67.3 | 68.2 | 68.0 | 67.5 | 67.8 | 67.8. |
| Viscosity Index | 106 | 105 | | | | |
| Flash, OC, °F | 455 | 470 | 485 | 475 | 470 | 480. |
| Fire, OC, °F | 520 | 525 | 535 | 525 | 535 | 530. |
| Color, ASTN Union | 1.75 | 1.75 | 3.5 | 3.5 | 4.0 | 2.75. |
| Pour, °F | 0 | 0 | 0 | +5 | 0 | +5. |
| Copper Strip Test, 212° F., 3 Hrs | passes | passes | passes | passes | passes | passes. |
| Sulfur, B, Percent | 0.11 | 0.21 | 0.45 | 0.15 | 0.15 | 0.19. |
| Neutralization Value: | | | | | | |
| ASTM D 974-48 T Total Base No | nil | 0.52 | 0.8 | 0.17 | 0.22 | 0.8. |
| Oxidation & Bearing Corrosion Test: | | | | | | |
| Duration of Test, Hrs | 48 | | 48 | 48 | 48 | 48. |
| Air Rate, Ml./Hr | 2,000 | | 2,000 | 2,000 | 2,000 | 2,000. |
| Quantity of Oil, Ml | 300 | | 300 | 300 | 300 | 300. |
| Bearing Type— | | | | | | |
| Cu-Pb: Wt. Change, Grams | loss 0.0040 | | loss 0.0013 | loss 0.0018 | loss 0.0039 | loss 0.0026. |
| Cd-Ag: Wt Change, Grams | loss 0.0060 | | loss 0.0010 | loss 0.0010 | loss 0.0025 | loss 0.0008. |
| Engine Test, CRC L-4: | | | | | | |
| Engine Condition Rating | fails to complete. | 96 | 94 | 95 | 96 | 90. |
| Bearing Loss: Mg./Whole Bearing | | 0 | 47 | 107 | 98 | 147. |
| Corrosion Test, ASTM D 665-46 T: | | | | | | |
| Distilled Water— | | | | | | |
| Steel Rod: Appearance | rust | bright | | | | |
| Area Rusted: Percent | 100 | 0 | | | | |

The "oxidation and bearing corrosion test" referred to in the above table is conducted as follows: An alloy bearing shell of certain commonly used standard dimensions is submerged in 300 ml. of the oil or oil composition to be tested in a 400 ml. Pyrex beaker and heated in a thermostatic oil bath to 347° F. Air is then bubbled through the oil in contact with the bearing shell at a rate of 2000 ml. per hour. At the end of 48 hours the loss of weight and condition of the bearing shell are determined, the bearing shell being washed free of oil and dried before weighing. When determining the effectiveness of various additives, the usual procedure is to run a blank test simultaneously with the oil composition being tested, employing for that purpose a sample of the untreated oil. In this test it is advantageous to employ commercial bearing shells. These shells comprise a suitable metal backing faced with the alloy bearing metal. In this way the actual bearing face is subjected to severe deterioration conditions. By comparison of the results of such tests with actual service tests, we have found them to be in substantial agreement as to suitability of particular lubricants.

The haze-inhibiting effect of the resins of our invention in gasoline is shown in the following table, wherein the additives of Examples II to V, respectively, were added to a finished leaded gasoline in the proportion of 40 pounds of resin (dry basis) per 1000 barrels of gasoline.

*Table II*

| | Base Gasoline | Gasoline with Ex. II Additive | Gasoline with Ex. III Additive | Gasoline with Ex. IV Additive | Gasoline with Ex. V Additive |
|---|---|---|---|---|---|
| Gravity, ° API | 62.0 | 62.5 | 62.0 | 61.9 | 62.1. |
| Color, Lovibond, 1" Cell: | | | | | |
| 200 Red Series | 6 | 6.5 | 6.5 | 6.5 | 6.5. |
| 510 Yellow Series | 36 | 39 | 39 | 39 | 38. |
| Doctor | good | good | good | good | good. |
| Copper Strip Test, 122° F., 3 Hrs | passes | passes | passes | passes | passes. |
| Oxidation Stability, Minutes: | | | | | |
| ASTM D 525-49 | 240+ | 240+ | 240+ | 240+ | 240+. |
| TEL: Ml./Gal | 2.0 | 2.0 | 2.0 | 2.0 | 2.0. |
| U-V Light Stability, Minutes to Precipitate. | 15 | 360 | 300 | 300 | 300. |

The sludge-inhibiting effect of our new resins in distillate fuel oils is shown in the following table, where a finished No. 2 grade fuel oil was treated, on the basis of 50 pounds of resin (dry basis) per 1000 barrels of fuel oil, with the additives of Examples II to V, respectively.

*Table III*

|  | Base Fuel Oil | Fuel Oil with Ex. II Additive | Fuel Oil with Ex. III Additive | Fuel Oil with Ex. IV Additive | Fuel Oil with Ex. V Additive |
|---|---|---|---|---|---|
| Gravity, °API | 35.7 | 35.9 | 36.0 | 35.8 | 35.8 |
| Viscosity, SUS: 100° F | 35.0 | 35.8 | 35.5 | 36.2 | 35.2 |
| Flash, P. M., ° F | 166 | 170 | 169 | 168 | 170 |
| Pour, ° F | 0 | 0 | 0 | 0 | 0 |
| Color, ASTM Union | 2.75 | 3.0 | 3.0 | 3.0 | 2.0 |
| Carbon Residue, Conradson, percent | trace | trace | trace | trace | trace |
| U-V Light Stability, Hrs. to Precipitate | 4 | 20 | 20 | 20 | 20 |

The antioxidant effect of our new resins in greases is shown in the following table, where the resins of Examples II to V, respectively, were added in an amount of 1.5 per cent by weight (dry basis) to a soda-tallow and stearic acid base grease.

*Table IV*

|  | Base Grease | Grease with Ex. II Additive | Grease with Ex. III Additive | Grease with Ex. IV Additive | Grease with Ex. V Additive |
|---|---|---|---|---|---|
| Gravity, °API | 21.8 | 21.7 | 22.0 | 22.5 | 22.0 |
| Melting Point, ° F.: Hawxhurst | 301 | 310 | 302 | 308 | 305 |
| Penetration, ASTM D 217-48: |  |  |  |  |  |
| Unworked | 271 | 269 | 273 | 270 | 269 |
| Worked | 280 | 285 | 284 | 285 | 281 |
| Oxidation Stability, 210° F., ASTM D 942-50: |  |  |  |  |  |
| 100 Hr. Pressure Drop, p. s. i. |  | 5 | 5 | 8 | 15 |
| 5 p. s. i. Pressure Drop, Hrs. | 16 | 100 | 100 | 90 | 70 |

As shown in Table I, our new resins confer effective detergent properties on mineral lubricating oils. Thus, the engine condition rating shown under the CRC L-4 engine tests indicates the freedom from engine deposits obtained. As shown in the data under bearing loss in these tests, which indicates the amount of bearing corrosion expressed in milligrams loss in weight of a standard bearing, the new resins tested confer excellent bearing corrosion inhibiting properties. A similar showing is made in the oxidation and bearing corrosion test ratings.

As shown in the U-V stability tests for gasoline compositions and fuel oil compositions containing the resins of our invention in Tables II and III, respectively, a marked retardation in haze formation is obtained with gasolines and a considerable retardation in sludge formation is obtained with distillate fuel oils. Furthermore, as shown in Table IV in the testing of greases containing our new resins, an improvement in the oxidation stability of such greases is obtained. It should be noted that although our new resins contain sulfur, such sulfur is firmly bound in the resin molecule as indicated by the fact that lubricating oils and gasolines containing our resins pass the copper strip test.

While we have shown in the examples mineral oil compositions containing certain resins, our invention is not to be taken as limited to such specific resins, but comprises all such materials within the purview of this disclosure. Furthermore, the invention is not to be limited to the use of our metal and sulfur containing resins in the preparation of compounded lubricating oils, but it comprises all mineral oil lubricants containing our new resins, such as greases and the like. As is known in the lubricating art, other additives in addition to the resins of our invention can be employed. These are materials such as pour point depressants, viscosity index improvers, antifoam agents, coloring materials, thickeners and the like. Furthermore, as has been shown hereinabove, our new resins can be added to a wide variety of mineral oils including lubricating oils, gasolines, distillate fuels, furnace oils, light naphthas, slushing oils, etc. with beneficial effects.

Resort may be had to such modifications and variations as fall within the spirit of the invention and the scope of the appended claims.

We claim:

1. The process of preparing an oil soluble, metal and sulfur containing, permanently thermoplastic, resinous condensation product which comprises condensing in an aqueous medium formaldehyde, a metal sulfide selected from the group consisting of alkali metal sulfides, alkaline earth metal sulfides, and mixtures thereof, an amine selected from the group consisting of primary and secondary amines, and an alkylated monohydric phenol having at least one free reactive position in the nucleus, at least one alkyl group of such alkylated phenol containing at least 4 carbon atoms; the mol ratio of amine to phenol ranging from 0.1 to 1, at least one mol of formaldehyde being employed for every two mols of the total molar amount of phenol and amine, and at least one equivalent of metal sulfide being employed for every two mols of the phenol.

2. The process of claim 1, wherein the condensation is carried out in a mineral oil and there is recovered a solution of the resinous reaction product in the mineral oil.

3. The process of claim 1, wherein the metal sulfide is at least in part an alkali metal sulfide and the metal and sulfur containing resin obtained is subjected to metathesis with a water soluble salt of a metal other than an alkali metal.

4. The process of claim 1, wherein the phenol is tetramethylbutyl phenol.

5. The process of claim 4, wherein the amine is aniline and the metal sulfide is sodium sulfide.

6. The process of claim 4, wherein the amine is cyclohexylamine and the metal sulfide is sodium sulfide.

7. The process of claim 4, wherein the amine is N-methyl aniline and the metal sulfide is calcium sulfide.

8. The process of claim 4, wherein the amine is a mixture of the primary fatty amines obtained from coconut oil fatty acids and the metal sulfide is calcium sulfide.

9. The process of claim 4, wherein the amine is diphenylamine and the metal sulfide is sodium sulfide.

10. The process of claim 4, wherein the amine is a mixture of the primary fatty amines obtained from coconut oil fatty acids and the metal sulfide is a mixture of sodium sulfide and barium sulfide.

11. The process of preparing an oil soluble, metal and sulfur containing, permanently thermoplastic, resinous condensation product which comprises condensing in an aqueous medium 2 mols of formaldehyde, 1 mol of sodium sulfide, 0.5 mol of aniline and 2 mols of tetramethylbutyl phenol, reacting the resulting condensation product with calcium chloride, and recovering the calcium and sulfur containing resin thus obtained.

12. An oil soluble, metal and sulfur containing permanently thermoplastic, resinous condensation product obtained by the process of claim 1.

13. A mineral oil solution of an oil soluble, metal and sulfur containing, permanently thermoplastic, resinous condensation product obtained by the process of claim 2.

14. An oil soluble, metal and sulfur containing, permanently thermoplastic, resinous condensation product obtained by the process of claim 3.

15. An oil soluble, metal and sulfur containing, permanently thermoplastic, resinous condensation product obtained by the process of claim 4.

16. An oil soluble, metal and sulfur containing, permanently thermoplastic, resinous condensation product obtained by the process of claim 5.

17. An oil soluble, metal and sulfur containing, permanently thermoplastic, resinous condensation product obtained by the process of claim 6.

18. An oil soluble, metal and sulfur containing, permanently thermoplastic, resinous condensation product obtained by the process of claim 7.

19. An oil soluble, metal and sulfur containing, permanently thermoplastic, resinous condensation product obtained by the process of claim 8.

20. An oil soluble, metal and sulfur containing, permanently thermoplastic, resinous condensation product obtained by the process of claim 9.

21. An oil soluble, metal and sulfur containing, permanently thermoplastic, resinous condensation product obtained by the process of claim 10.

22. An oil soluble, metal and sulfur containing, permanently thermoplastic, resinous condensation product obtained by the process of claim 11.

23. A mineral oil composition comprising a major amount of a mineral oil and a minor amount, from about 0.001 to 25 per cent by weight, of an oil soluble, metal and sulfur containing, permanently thermoplastic, resinous condensation product obtained by the process of claim 1.

24. The composition of claim 23, wherein the mineral oil is a lubricating oil.

25. The composition of claim 23, wherein the mineral oil is a distillate fuel oil.

26. The composition of claim 23, wherein the mineral oil is gasoline.

27. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 1.

28. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 3.

29. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 4.

30. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 5.

31. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 6.

32. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 7.

33. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 8.

34. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 9.

35. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 10.

36. A lubricant composition comprising a major amount of a mineral lubricating oil and a minor amount, sufficient to confer improved detergent properties, of an oil soluble, metal and sulfur containing, permanently thermoplastic, resinous condensation product obtained by the process of claim 11.

37. A grease composition comprising a major amount of a mineral lubricating oil thickened to a grease with a soap and a minor amount, sufficient to retard oxidation of said grease, of an oil soluble, metal and sulfur containing, permanently thermoplastic, resinous condensation product obtained by the process of claim 1.

References Cited in the file of this patent

UNITED STATES PATENTS

| Number | Name | Date |
|---|---|---|
| 2,377,955 | Mixon | June 12, 1945 |
| 2,431,011 | Zimmer | Nov. 18, 1947 |
| 2,440,375 | McCleary | Apr. 27, 1948 |
| 2,459,116 | Oberright | Jan. 11, 1949 |
| 2,516,119 | Hersh | July 25, 1950 |
| 2,518,379 | Rogers | Aug. 8, 1950 |